United States Patent [19]

Oinuma

[11] Patent Number: 5,229,958

[45] Date of Patent: Jul. 20, 1993

[54] DATA INPUT DEVICE HAVING ARITHMETICAL FUNCTION

[75] Inventor: Toshitaka Oinuma, Tokyo, Japan

[73] Assignee: Hitachi, Ltd., Tokyo, Japan

[21] Appl. No.: 751,786

[22] Filed: Aug. 29, 1991

[30] Foreign Application Priority Data

Aug. 29, 1990 [JP] Japan .................. 2-226929

[51] Int. Cl.⁵ ............................... G06F 3/00
[52] U.S. Cl. .................. 364/709.01; 364/709.09
[58] Field of Search ............... 364/709.01, 709.09, 364/710.14

[56] References Cited

U.S. PATENT DOCUMENTS

| | | | |
|---|---|---|---|
| 4,107,784 | 8/1978 | Van Bemmelen | 364/900 |
| 4,386,412 | 5/1983 | Ito | 364/710.14 |
| 4,412,300 | 10/1983 | Watson et al. | 364/709.09 |
| 4,530,069 | 7/1985 | Desrochers | 364/900 |
| 4,811,257 | 3/1989 | Sumitani et al. | 364/709.01 |

*Primary Examiner*—Tan V. Mai
*Attorney, Agent, or Firm*—Antonelli, Terry, Stout & Kraus

[57] ABSTRACT

An arithmetical function is provided onto a keyboard connected to a computer for executing an application software program. A desired arithmetical function is carried out by using a group of keys on the keyboard after the execution of the application software program in the inside of the computer is interrupted. The arithmetical result data is given as input data to the application software program executed in the inside of the computer. A display section is provided on the keyboard separately from a display section of the computer, so that the process of carrying out the arithmetical function can be checked on the keyboard.

13 Claims, 4 Drawing Sheets

DATA INPUT DEVICE HAVING ARITHMETICAL FUNCTION

BACKGROUND INVENTION

The present invention relates to a data input device in an information processor such as a personal computer, a workstation, etc., and particularly relates to a data input device having an arithmetical function.

In general, a keyboard is used in a data input device in an information processor such as a personal computer, a workstation, etc. Heretofore, this type keyboard is used for data input or for temporary storage of inputted data, but it is not used for carrying out an arithmetical function on inputted data. On the other hand, in an information processor used for generating a document or a table, it is general that a known application program such as a so-called spreadsheet program is used for carrying out an arithmetical function on data inputted through a keyboard or the like.

When a spreadsheet generating process or the like is carried out in an information processor such as a personal computer, a workstation, etc., there is a case where arithmetical result data are required as input data. In this case, arithmetical result data are inputted through a conventional data input device after the arithmetical result data are beforehand obtained by calculation in a desk calculator, calculation manually on paper, or the like, because the conventional data input device such as a keyboard has no pre-process capability for directly carrying out an arithmetical function on inputted data. There arises a problem in that the calculation work requires much labor and much time. On the other hand, the calculation in a desk calculator, the calculation manually on paper, or the like, is not required if a spreadsheet program is used. In the case where another software program such as a document editing software program, a database software program, a program editing software program, etc. is used in an information processor, the table processing software program cannot be used simultaneously in the information processor. There arises a problem against convenient use.

SUMMARY OF THE INVENTION

An object of the present invention is to eliminate labor and time taken in calculation in use of a desk calculator or a table processing software program or in calculation manually on paper in the case where arithmetical result data are required as input data in an information processor such as a personal computer, a workstation, etc.

To attain the foregoing object, an arithmetical means is provided inside of the data input device used for inputting data in the information processor so that the arithmetical result data calculated by the arithmetical means can be inputted.

Further, the data input device includes a mode changeover means for changing over between an arithmetical mode and an ordinary data input mode, and a display means for displaying data used for the arithmetical function, arithmetical result data, arithmetic logic, etc.

Further, the data input device includes a data fetching means for fetching data displayed on a display unit of a data output device of the information processor as data used for the arithmetical function.

The same function can be attained by utilizing an arithmetical processing means in the inside of the information processor, instead of the arithmetical means provided in the inside of the data input device.

In the data input device according to the present invention, data inputted through the keyboard or the like are directly delivered to the processor in the case of the ordinary data input mode, but arithmetical result data obtained by carrying out the arithmetical function on data inputted through the keyboard or the like are delivered as input data to the processor.

If the data input device according to the present invention is used, not only an arithmetical function can be carried out on data inputted through the keyboard or the like without consciousness of the software program used during a process such as a document generating process, a table generating process, etc. and without depending on a desk calculator or the like, but also the arithmetical result data can be outputted to the designated position of the display unit or the like. Accordingly, there is no necessity of re-inputting data. As a result, both shortening of the input time and prevention of input error can be attained, so that the load imposed on the user can be lightened.

DESCRIPTION OF THE PREFERRED EMBODIMENTS

An embodiment of the present invention will be described with reference to the drawings.

Figure 1:
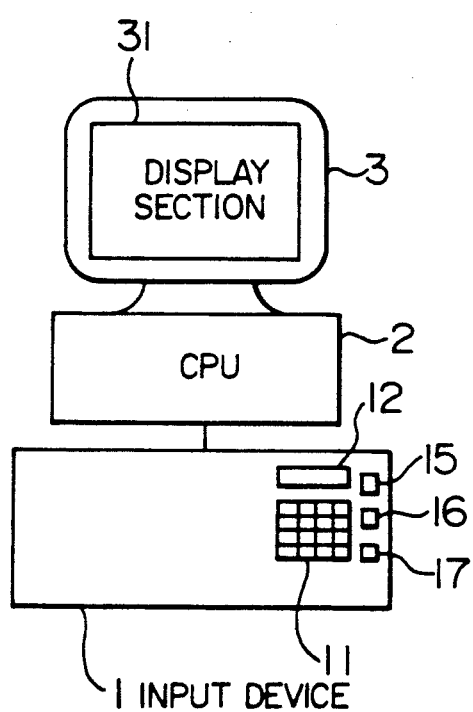
FIG. 1 is a view showing the whole outline of an information processor containing a data input device according to the present invention.

FIG. 1 is a view totally showing the outline of an information processor containing a data input device according to the present invention. In the drawing, numeral 1 designates a data input device according to the present invention, 2 a body of a central processing unit and 3 a data output device including a display section 31. For example, the data input device 1 is constituted by a keyboard having a group of keys 11 for inputting data or the like therethrough. In addition to, the group of keys 11, a display section 12 for displaying inputted data, arithmetical result data, arithmetic logic data, etc., a mode changeover switch 15 for changing over between a data input mode and an arithmetical mode, a data fetching switch 16 for fetching data displayed on the display section 31 of the data output device 3 through the central processing unit 2 and a data write switch 17 for sending arithmetical result data, etc. to the data output device 3 through the central processing unit 2 are provided on a surface of the keyboard (data input device 1).

Figure 2:
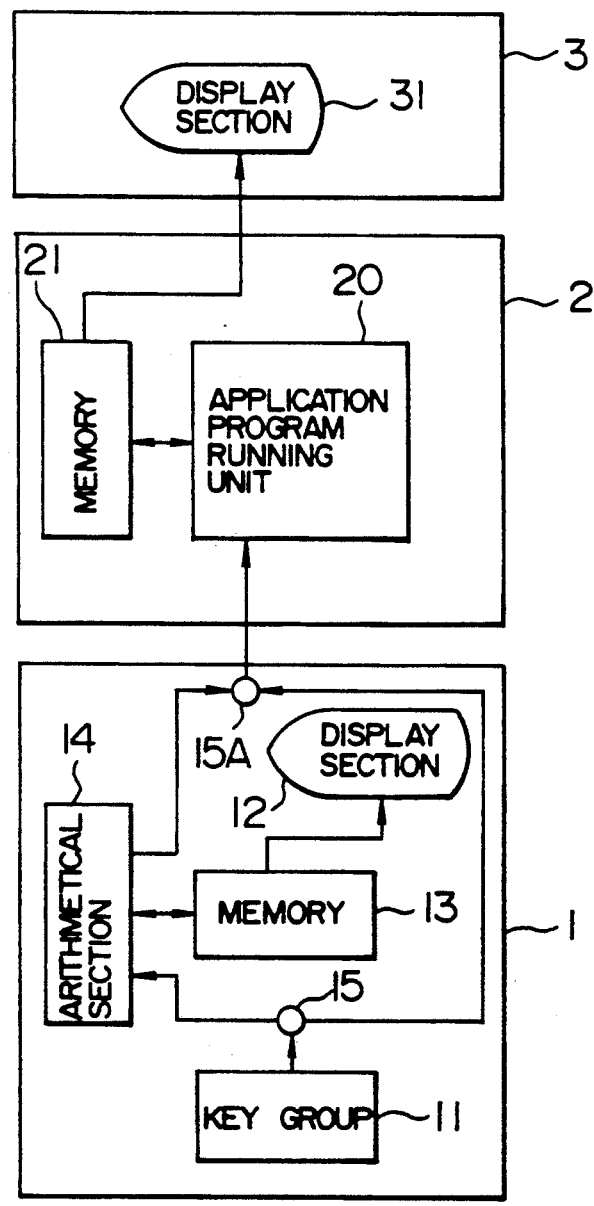
FIG. 2 is a block diagram showing the inside structure of the data input device as an embodiment of the present invention.

FIG. 2 is a block diagram showing the inside structure of the data input device 1. In this embodiment, the data input device 1 includes a memory for storing input data, arithmetical result data, etc., and an arithmetical section 14 for carrying out an arithmetical function on input data. A group of keys 11, a display section 12 and a mode changeover switch 15 are provided in the same manner as in FIG. 1. A data fetching switch 16 and a data write switch 17 which are not shown in FIG. 2 but shown in FIG. 1 are provided. The central processing unit 2 includes an application program running unit 20 and a memory 21.

Figure 3:
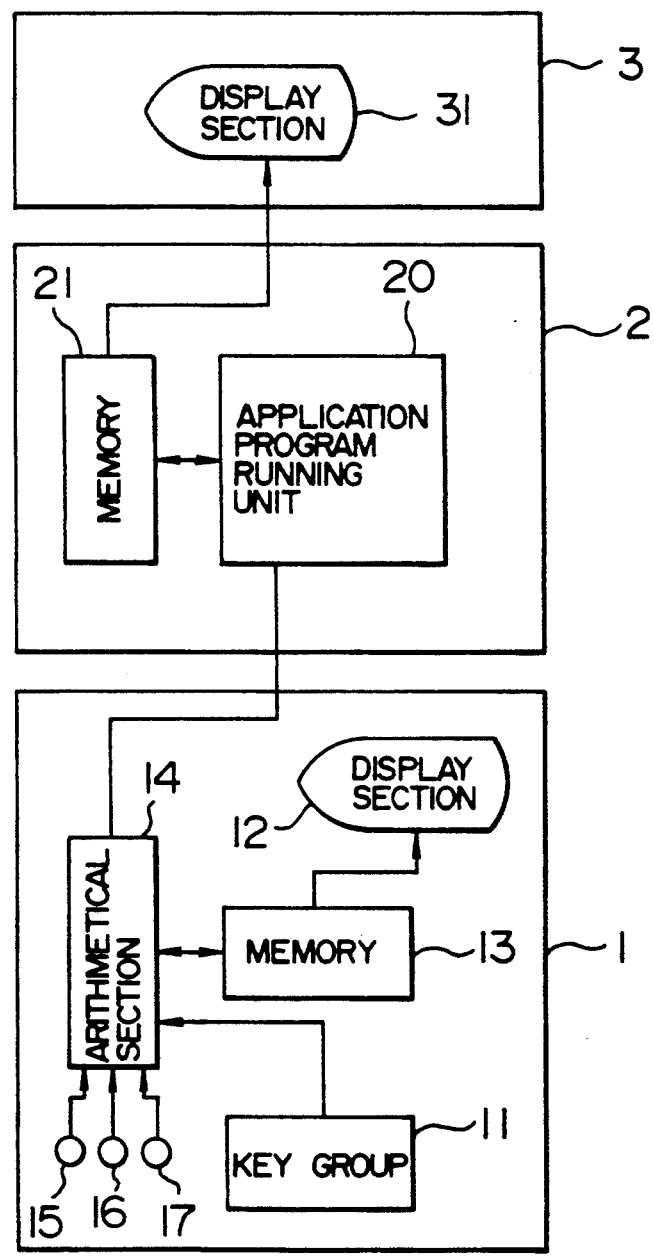
FIG. 3 is a block diagram showing the inside structure of the data input device as another embodiment of the present invention.

FIG. 3 is a block diagram showing the inside structure of another embodiment of a data input device according to the present invention. In this embodiment, numerals which are the same as those in FIG. 2 indicate the same or equivalent parts of FIG. 1. In the figure, a group of keys 11, a mode changeover switch 15, a data fetching switch 16 and a data write switch 17 are all connected directly to an arithmetical section 14. An output of the arithmetical section 14 is directly supplied to the central processing unit 2.

In an ordinary operation, the arithmetical section 14 receives data outputs from the key group 11, and delivers them to the central processing unit as they are. The data from the key group 11 may be displayed on a display section 12 by the arithmetical section 14.

However, when the arithmetical section 14 senses the depression of the mode changeover switch 15, the section 14 changes its program to perform an arithmetical function, and regards the data from the key group 11 as inputs of the arithmetical function. It is noted that in this arithmetical function mode any data from the key group 11 is not sent to the central processing section 2, though data inputs and an intermediate arithmetical result are displayed on the display section 12. The result of the arithmetical function is stored in a memory 13. When the arithmetical section 14 senses the depression of the data write switch 17, the section 14 reads the arithmetical result stored in the memory 13 and sends it to the central processing unit 2. The central processing unit 2 receives the arithmetical result from the arithmetical section 14 as if the application program running in the central processing unit 2 receives the arithmetical result directly from the key group 11.

Figure 4:
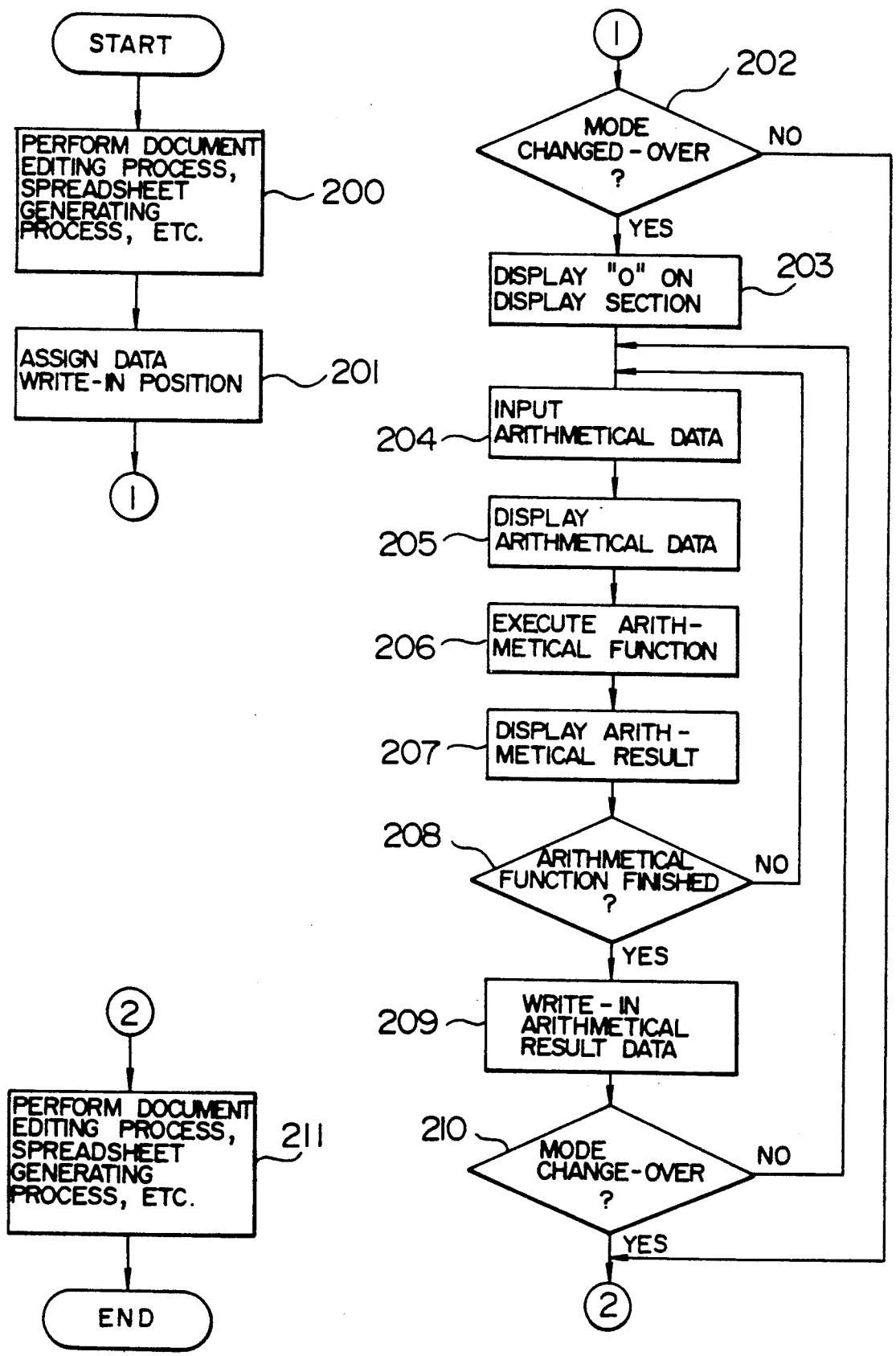
FIG. 4 is a flow chart showing an example of procedure in use of the data input device according to the present invention.

FIG. 4 is a flow chart showing an example of procedure in use of the data input device according to the present invention. The usage of the data input device according to the present invention will be described with reference to FIG. 4.

It is now assumed that a process, such as a document generating process, a table generating process, etc., is carried out in an information processor, such as a personal computer, a workstation, a word processor, etc., having a data input device 1 according to the present invention, a central processing unit 2 connected to the data input device 1, and a data output device 3 (step 200). In the case where inputting of an arithmetical result data is required, an arithmetical result data input position is set by adjusting a cursor or the like to the position on the display section 31 of the data output device 3 (step 201). Then, the operation mode is changed over from an input mode to an arithmetical mode through the mode changeover switch 15 (YES in step 202). When the operation mode is changed over to the arithmetical mode, the application program running through the central processing unit 2 is kept to an input-wait state and then "0" is initially displayed on the display section 12 of the data input device 1 (step 203). Then, data subjected to an arithmetical function are inputted through the group of keys 11 or the like (step 204). The inputted data are successively stored in the memory 13 and at the same time displayed on the display section 12 of the data input device 1 (step 205). When the inputting of a predetermined number of data is finished, an arithmetical function is carried out in the arithmetical section 14 (step 206). The arithmetical result data is stored in the memory 13 and at the same time displayed on the display section 12 of the data input device 1 (step 207). In the case where the arithmetical function is to be continued (NO in step 208), data to be subjected to the arithmetical function can be inputted again through the group of keys 11 (step 204). In the case where the arithmetical function is to be finished (YES in step 208), the data input device 1 judges the end of the arithmetical function by pushing the data write switch 17 of the data input device 1. In the case of the end of the arithmetical function (YES in step 208), the application program running through the central processing unit 2 regards the arithmetical result data stored in the memory 13 of the data input device 1 as general input data so that the arithmetical result data is written in the designated position on the display section 31 of the data output device 3 through the central processing unit 2 (step 209). When the mode changeover switch 15 is then kept to the arithmetical mode (NO in step 210), the next data to be subjected to the arithmetical function can be inputted (step 204). When the mode changeover switch 15 is operated to change over the operation mode from the arithmetical mode to the input mode (YES in step 210), the initial process such as a document editing process, a spreadsheet generating process, etc. can be continued (step 211). In the case of the input mode, the data input device 1 operates in the same manner as in the conventional data input device so that data inputted through the group of keys 11 or the like are directly delivered to the central processing unit 2.

If fetching of data displayed on the display section 31 of the output device 3 is designated through the data fetching switch 16 of the data input device 1 when data used for the arithmetical function is inputted (step 204), the data displayed on the display section 31 can be fetched into the memory 13 of the data input device 1 through the central processing unit 2 to carry out the arithmetical function on the data.

Figure 5:
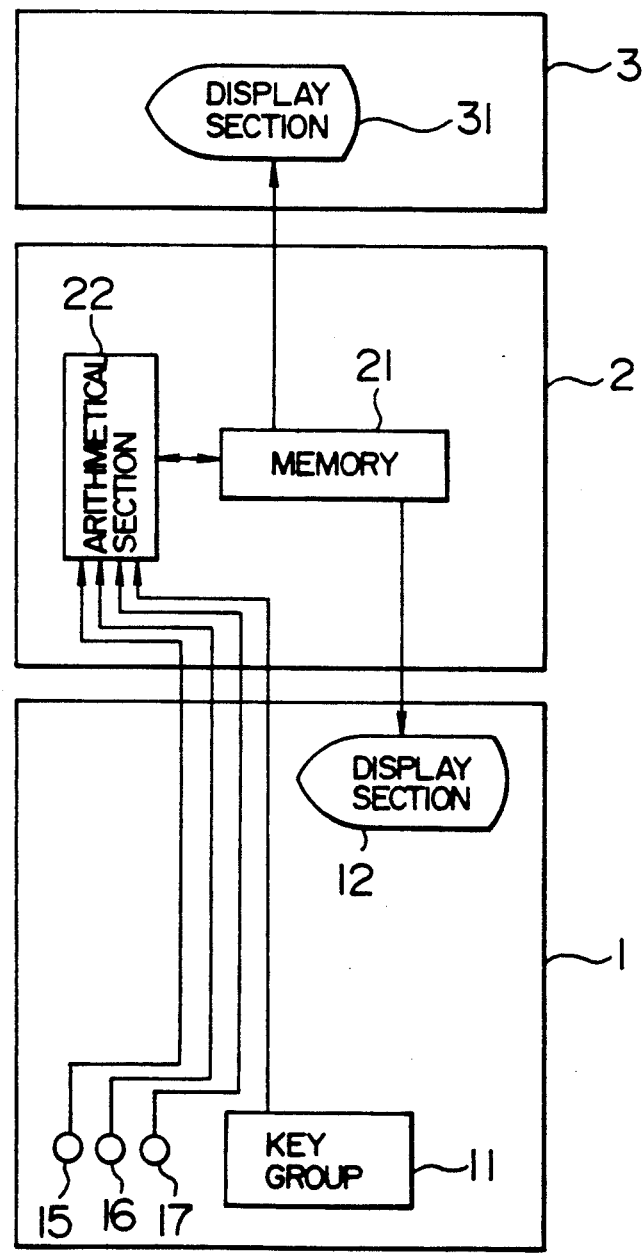
FIG. 5 is a block diagram showing the inside structure of the data input device as a further embodiment of the present invention.

Although the embodiments in FIGS. 2 and 3 have shown the case where the memory 13 and the arithmetical section 14 are provided in the data input device 1, the invention can be applied to the case where the memory 13 and the arithmetical section 14 are provided in the central processing unit 2 or to the case where devices in the central processing unit may be utilized. FIG. 5 is a block diagram showing a further embodiment of the present invention in which the central processing unit 2 includes a memory 21 and an arithmetical section 22. Other conditions in FIG. 5 such as the arrangement of keys on the keyboard of the data input device 1 are similar to those in FIG. 1.

When the mode changeover switch 15 is set to the input mode in FIG. 5, data inputted through the group of keys 11 are directly displayed on the display section 31 of the data output device 3 through the central processing unit 2. When the mode changeover switch 15 is operated to changeover the operation mode from the input mode to the arithmetical mode, data inputted through the group of keys 11 are stored in the memory 21 of the central processing unit 2 and subjected to the arithmetical function in the arithmetical section 22. At this time, input data and arithmetical result data are displayed on the display section 12 of the data input device 1 through the memory 21 of the central processing unit 2. When the arithmetical function is to be finished by judging from the display on the display section 12, the user can depress the data write switch 17 (FIG. 1) of the data input device 1 to designate data writing. As a result, the arithmetical result data in the memory 21 of the central processing unit 2 is written in the designated position on the display section 31 of the data output device 3. If the data fetching switch 16 (FIG. 1) of the data input device 1 is depressed in the arithmetical mode, data displayed on the display section 31 of the output device 3 can be fetched in the memory 21 of the central processing unit 2 to be used for the arithmetical function in the same manner as in the aforementioned embodiment in FIG. 2.

What is claimed is:

1. A data input device for use in sending input data to an information processor which operates to execute an application program using said input data, comprising:
   a group of keys for supplying input data;
   arithmetical means responsive to input data supplied from said group of keys for carrying out an arithmetical function and for supplying arithmetical result data; and
   selection means for selecting either input data inputted through said group of keys or the arithmetical result data supplied by said arithmetical means for outputting to said information processor for use in executing an application program.

2. A data input device according claim 1, wherein said selection means includes a mode changeover means for forming a path to lead the data inputted through said group of keys directly to said information processor while bypassing said arithmetical means.

3. A data input device according to claim 2, further comprising display means for displaying information related to an arithmetical function carried out by said arithmetical means.

4. A data input device according to claim 3, wherein said display means is used for displaying arithmetical result data calculated by said arithmetical means, and wherein said data input means includes data write means for giving an instruction to deliver the arithmetical result data displayed on said display means to said information processor.

5. A data input device according to claim 3, wherein said display means is used for displaying arithmetical result data calculated by said arithmetical means, and wherein said data input means includes data write means for giving an instruction to deliver the arithmetical result data displayed on said display means to said information processor.

6. A data input device according to claim 1, wherein said selection means includes a mode changeover switch connected to said arithmetical means for giving an instruction to said arithmetical means to deliver data inputted through said group of keys directly to said information processor without performing an arithmetical operation thereon.

7. A data input device according to claim 6, further comprising display means for displaying information related to an arithmetical function carried out by said arithmetical means.

8. A data input device according to claim 1, further comprising display means for displaying information related to an arithmetical function carried out by said arithmetical means.

9. A data input device according to claim 8, wherein said display means is used for displaying arithmetical result data calculated by said arithmetical means, and wherein said data input means includes data write means for giving an instruction to deliver the arithmetical result data displayed on said display means to said information processor.

10. An information processor comprising:
    an execution means for executing an application program in the inside of said information processor;
    a first display means for displaying the result of execution of the application program; and
    a data input device connected to the inside of the information processor;
    wherein said data input device includes:
    a group of keys for receiving input data therethrough;
    a mode changeover switch for designating an arithmetical function in said data input device separately from said application program;
    a second display means for displaying information related to the arithmetical function in said data input device; and
    a data write means for giving an instruction to deliver the arithmetical result data displayed on said second display means to said execution means as input data to the application program; and
    wherein said execution means:
    executes the arithmetical function on the data inputted through said group of keys after interrupting the execution of the application program according to the instruction of said mode changeover means;
    displays the arithmetical result data on said second display means; and
    restarts the execution of the application program after writing the arithmetical result data displayed on said second display means as input data to the application program according to the instruction of said data write means.

11. An information processor comprising:
    execution means for executing an application program;
    first display means for displaying a result of execution of the application program; and
    a data input device connected to said execution means for supplying data to be used in executing an application program, wherein said data input device includes:
    (a) a group of keys for supplying input data;
    (b) a mode changeover switch for designating an arithmetical function in said data input device separately from said application program;
    (c) arithmetical means connected to receive input data from said group of keys for performing an arithmetical function on said input data and producing arithmetical result data in response to said mode changeover switch;
    (d) second display means for displaying arithmetical result data related to the arithmetical function performed by said arithmetical means; and
    (e) data write means for giving an instruction to deliver arithmetical result data displayed on said second display means to said execution means as input data to the application program.

12. An information processor according to claim 11, further including means for interrupting the execution of an application program by said execution means in response to said mode changeover means when said arithmetical means is instructed to perform an arithmetical function; and means for restarting the execution of the application program after the arithmetical result data is supplied to said execution means by said data write means.

13. An information processor comprising:
a central processing unit running an application program;
a first display means connected to said central processing unit for displaying the result of execution of the application program; and
a data input device connected to said central processing unit for providing input data to application program, wherein said data input device includes:
a group of keys for receiving input data;
an arithmetical means connected to said group of keys and for carrying out an arithmetical function on data inputted through the group of keys;
a second display means for displaying information related to the arithmetical means; and
a data write means for giving an instruction to deliver the arithmetical result data displayed on said second display means to said central processing unit as input data to the application program;
wherein said data input device further includes a mode changeover means for forming a path to lead the data inputted through said group of keys directly to said central processing unit while bypassing said arithmetical means.

* * * * *